United States Patent

Merkel et al.

(10) Patent No.: US 9,364,810 B2
(45) Date of Patent: Jun. 14, 2016

(54) CHEMICAL REACTOR WITH KNITTED WIRE MESH FABRIC AS A HOLDING DEVICE FOR PARTICLES

(75) Inventors: Michael Merkel, Düsseldorf (DE);
Karl-Heinz Wilke, Moers (DE);
Thomas Knauf, Dormagen (DE)

(73) Assignee: Bayer Materialscience AG, Leverkusen (DE)

( * ) Notice: Subject to any disclaimer, the term of this patent is extended or adjusted under 35 U.S.C. 154(b) by 21 days.

(21) Appl. No.: 13/988,326

(22) PCT Filed: Nov. 15, 2011

(86) PCT No.: PCT/EP2011/070101
§ 371 (c)(1),
(2), (4) Date: Jul. 25, 2013

(87) PCT Pub. No.: WO2012/065969
PCT Pub. Date: May 24, 2012

(65) Prior Publication Data
US 2013/0296610 A1 Nov. 7, 2013

(30) Foreign Application Priority Data

Nov. 18, 2010 (DE) .......................... 10 2010 044 111

(51) Int. Cl.
*B01J 8/02* (2006.01)
*C07C 209/00* (2006.01)
*B01J 8/44* (2006.01)

(52) U.S. Cl.
CPC ................ *B01J 8/0292* (2013.01); *B01J 8/025* (2013.01); *B01J 8/44* (2013.01); *B01J 2208/00884* (2013.01); *Y10T 428/12424* (2015.01)

(58) Field of Classification Search
CPC ..................................................... B01J 8/0292
See application file for complete search history.

(56) References Cited

U.S. PATENT DOCUMENTS 2,283,499 A * 5/1942 Hachmuth ............. B01J 8/0453
208/146
2,915,375 A 12/1959 Shirk
(Continued)

FOREIGN PATENT DOCUMENTS

DE 19706434 A1 8/1998
JP 05-269364 10/1993
(Continued)

OTHER PUBLICATIONS

DE-19796434 machine translation of the description (printed 2014) pp. 1-2.*
(Continued)

*Primary Examiner* — Clinton Brooks
(74) *Attorney, Agent, or Firm* — McBee Moore Woodward Vanik IP, LLC

(57) ABSTRACT

In a chemical reactor for heterogeneously catalyzed reaction of a fluid, comprising a holding device for catalyst particles and/or inert particles (80, 100) through which the fluid flows, the side of the holding device lying upstream when viewed in the direction of flow of the fluid comprises knitted wire mesh fabric (50), and the average clear mesh width of the knitted wire fabric (50) is smaller than the average particle size $x_{50.3}$ of the particles (80, 100). The invention furthermore relates to a process for reaction of a fluid, wherein the reaction is carried out in a reactor according to the invention in the presence of heterogeneous catalyst particles (80) and the catalyst particles (80) are arranged in the holding device for catalyst particles (80). The invention also provides the use of knitted wire mesh fabric (50) as a holding device for catalyst particles and/or inert particles (80, 100) in chemical reactors.

26 Claims, 3 Drawing Sheets

(56) References Cited

U.S. PATENT DOCUMENTS

| | | | |
|---|---|---|---|
| 5,188,813 A * | 2/1993 | Fairey et al. | 423/403 |
| 2004/0000472 A1 | 1/2004 | Smith, Jr. et al. | |
| 2004/0035418 A1 | 2/2004 | Wiid | |
| 2008/0200727 A1 * | 8/2008 | Eberhardt et al. | 564/471 |

FOREIGN PATENT DOCUMENTS

| | | |
|---|---|---|
| JP | H-10-503705 A | 4/1998 |
| JP | 2004-531596 A | 10/2004 |
| JP | 2006-506227 A | 2/2006 |
| WO | 9535160 A | 12/1995 |
| WO | 02/070120 A1 | 9/2002 |

OTHER PUBLICATIONS

DE-19796434 machine translation of the claims (printed 2014) pp. 1.*

International Search Report for PCT/EP2011/070101 Mailed Jan. 23, 2012.

* cited by examiner

CHEMICAL REACTOR WITH KNITTED WIRE MESH FABRIC AS A HOLDING DEVICE FOR PARTICLES

CROSS REFERENCE TO RELATED APPLICATIONS

This application is a §371 National Stage Application of PCT/EP2011/070101, filed Nov. 15, 2011, which claims priority to German Application No. 10 2010 044 111.2; filed Nov. 18, 2010.

BACKGROUND OF THE INVENTION

1. Field of the Invention

The present invention relates to a chemical reactor for heterogeneously catalysed reaction of a fluid with an improved holding device for inert particles and/or catalyst particles through which the fluid flows. It furthermore relates to a process for carrying out chemical reactions by means of such a reactor and to the use of knitted wire mesh fabric in chemical reactors.

2. Description of Related Art

The hydrogenation of nitroaromatics to give the corresponding amines in a fixed bed reactor with axial flow can be carried out in a multi-stage process under adiabatic reaction conditions. Such hydrogenations proceed in periodic cycles, production cycles alternating with regeneration cycles in which, for example, carbon-containing deposits are removed by burning off.

Reactors for such reactions typically have a cylindrical shape and are equipped with a slotted screen which serves as a base for the fixed bed catalyst (Heterogeneous Catalysis in Industrial Practice, 2nd ed. 1996, page 474). These slotted screens must carry the weight of the catalyst and the additional load resulting from the pressure loss over the bulk catalyst.

Slotted screens such as are described, for example, in U.S. Pat. No. 2,915,375 are often used in this context. They comprise V-shaped wires arranged in parallel, which in their turn are supported again and fixed so that slots result, the width of which is smaller than the particle size of the material to be supported and which widen downwards, in order to lead away downwards any material which gets between the wires and to avoid blocking of the slotted screen.

Due to the periodic operation of the reactors, the screen is subjected to thermal stresses which lead to damage. This is the case in particular if exothermic reactions are carried out under adiabatic conditions, that is to say the heat of reaction liberated is taken up by the reaction gas, so that large jumps in temperature occur insider the reactor.

In these cases deformations in the V-shaped wires originally arranged in parallel can already occur after a few production cycles, up to breaking off or tearing of individual wires. The repair of a screen damaged in this way requires outlay and does not bring about permanent success. To minimize these problems, the slotted screens are as a rule fixed to a supporting ring mounted in a floating manner, which leaves a gap to the reactor wall in order to compensate thermal expansions.

Precisely in the case of larger reactors is an absolutely flat contact surface (support ring) to be manufactured for this ring, if at all, only with considerable outlay. Furthermore, it is difficult to manufacture exactly circular large reactors. As a consequence of these problems, a loss of catalyst often occurs in the form of the catalyst trickling through damaged areas of the slotted screen or through openings between the slotted screen and reactor wall or support ring.

The problems are intensified further by the use of ever smaller catalyst particles, which in general display a higher efficiency but also trickle more easily through small defects. On the surface of the bulk thrombus-shaped depressions arise due to loss of catalyst. The reaction gas then flows preferentially through the regions with the depressions, so that a non-uniform gas flow develops, up to bypassing of unreacted educt. The catalyst which has migrated to the reverse of the slotted screen can furthermore cause damage to the apparatuses downstream of it.

In order to avoid passage of catalyst through to the other side of the slotted screen, the catalyst can be mounted on a complex, multi-layered bulk of inert particles, the particle diameter in the layer closest to the catalyst being somewhat greater than the particle diameter of the catalyst and then increasing with each layer (Fixed-Bed Reactor Design and Diagnostics, 1990, FIG. 1.1, page 4).

By this means, quite large inert particles which cannot yet trickle through the screen at relatively small defects initially lie on the slotted screen. Disadvantages of this solution are on the one hand that a not inconsiderable part of the reactor is filled with inert material and is no longer available for the actual catalyst, and on the other hand that the introduction of the various layers into the reactor requires outlay. If the inert material is to be re-used when the reactor is filled again, this requires a multi-stage sieving of the material removed from the reactor in order to separate the particles of different sizes from one another.

SUMMARY

It was therefore the object of the invention to provide a reactor in which passage of catalyst through to the reverse of the support construction for the catalyst is prevented even in the event of repeated thermal stress, wherein the support construction is to be inexpensive, the outlay on maintenance is to be low and the filling of the reactor with bulk catalyst is to be simple.

DETAILED DESCRIPTION OF A PREFERRED EMBODIMENT

Figure 1:
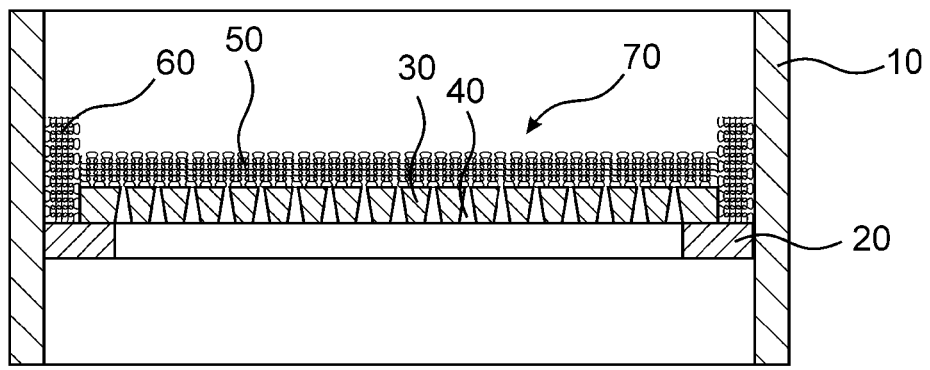
FIGS. 1-7 represent embodiments as described herein.

The object is achieved according to the invention by a chemical reactor for the heterogeneously catalysed reaction of a fluid, comprising a holding device for particles through which the fluid flows, the side of the holding device lying upstream when viewed in the direction of flow of the fluid comprising a knitted wire mesh fabric and the average clear mesh width of the knitted wire fabric being smaller than the average particle size $x_{50,3}$, which is determined by a sieve analysis carried out with a vibratory sieving machine, as specified in DIN 66165 (version of April 1987).

Mesh fabrics are known, for example, from the textile and decorative goods industry. Quite generally, a mesh fabric describes a flat structure in which a loop formed by means of a thread or several threads is looped into another loop, the "meshes" being formed. Woven fabrics in which the flat structure is produced by crossing of two thread systems are to be distinguished from these. Mesh fabric has a higher extensibility and elasticity than woven fabric. Mesh fabrics can be divided into knitted, warp-knitted and coulier fabrics. In principle all three are suitable for carrying out the present invention. However, knitted and/or coulier fabrics are particularly preferably employed, since these are even more elastic than the warp-knitted fabrics (which are in any case already elastic). In the present invention, a knitted wire mesh fabric is employed, i.e. the mesh fabric according to the invention is produced from wires and/or metal threads. In this context, the term "knitted wire fabric" in the context of the present invention includes all types of mesh fabric, that is to say also warp-knitted fabric. The knitted wire fabric is produced with wire processing machines which are known per se, such as are usual, for example, for uses in the automobile industry, process engineering and environmental engineering (e.g. wire knitting machines). Knitted wire fabrics from DHD Technology, for example, are suitable for carrying out the present invention.

The flexibility of the mesh fabric ensures that it is not damaged in periodic operation at different temperatures. At the same time, the 3-dimensional structure of the mesh fabric prevents too many meshes from becoming blocked with particles and the gas flow from being impeded.

In the context of this invention, particles can be understood as meaning both catalyst particles (e.g. a noble metal catalyst supported on aluminium oxide spheres) and inert particles (e.g. aluminium oxide spheres). Particles which are at least essentially spherical, i.e. any of their deviations from the ideal sphere geometry which are present are so small that in practice they behave like ideal spheres, are preferably employed. In principle, however, the invention can also be applied to asymmetrically shaped particles. The manufacturer's information serves as the first indication of the average particle size.

For accurate determination of the average particle size, a "particle size analysis" is necessary. In the context of this invention, this is effected by sieve analysis. In this context, according to the invention the value based on weight ("$x_{50.3}$") is used as the average particle size.

For determination of the average particle size in the context of the present invention, a procedure is thus now followed in which a representative sample of the particles to be supported is first subjected to a sieve analysis and the result is evaluated on the basis of the weight. The sieve analysis in this context is carried out using a vibratory sieving machine (e.g. model AS 200 digit from Retsch), in which the analysis sieves are arranged one above the other with increasing mesh width to form a sieve set. The choice of the analysis sieves (diameter and mesh width) primarily depends on the amount of material for sieving and the particle size distribution to be expected (preliminary experiments may be necessary). The number of sieves and the graduations of the nominal opening widths should be chosen such that as far as possible the entire particle spectrum of the sample is divided into fractions. When carrying out the sieve analysis, it is to be ensured that the maximum passage of sieved material (optimum sieving performance) is achieved. If necessary (for example if new particles for which operating experience is not yet available, are to be employed), suitable sieving times and amplitudes must be determined experimentally in preliminary experiments. A first indication of the amplitude results from observation of the movement of the material to be sieved. This should be neither too weak nor too intense. The optimum sieving time is achieved when the weight passing through the sieve in one minute changes by less than 0.1% of the amount introduced (DIN 66165, version of April 1987). The person skilled in the art is familiar with the methods only briefly outlined here.

The sieve analysis delivers as the result the particle size distribution of the particles measured. The result is preferably presented in the form of a graph by plotting the weight content of the individual fractions ("$p_3$") in a bar chart and the cumulative sum curve ("$Q_3$") from the percentage contents against the nominal sieve opening widths (x). The person skilled in the art can easily calculate, either manually or preferably by computer-assisted evaluation programs, the average particle size $x_{50.3}$ (i.e. 50% by weight of the particles are smaller than the corresponding value x).

If this first result indicates a sufficient homogeneity of the sample, the average particle size $x_{50.3}$ determined in this way is the value required for carrying out the invention. In this connection, a sufficient homogeneity is understood as meaning that the particle size distribution is monomodal, and that in each case a maximum of 0.1% by weight of all the particles lie in the range between $\frac{1}{2} x_{50.3}$ and $\frac{2}{3} x_{50.3}$ or in the range between $1\frac{1}{3} x_{50.3}$ and $1\frac{1}{2} x_{50.3}$. Furthermore, no particles should be smaller than $\frac{1}{2} x_{50.3}$ or larger than $1\frac{1}{2} x_{50.3}$. If this first result does not indicate a sufficient homogeneity of the sample in the above sense, the particles to be supported are homogenized by sieving on a large industrial scale, i.e. dust contents and fragments which can no longer be employed, are separated off. This is carried out until the homogeneity requirements mentioned are met.

The chemical reactor can be, for example, a fixed bed reactor with axial flow, such as is employed in the hydrogenation of nitrobenzene to give aniline. The fluid to be reacted in the reactor can be liquid, gaseous or supercritical. It can contain one reactant or a mixture of several reactants.

As will be explained later in more detail, the particles retained by the knitted wire mesh fabric can be both catalyst particles and inert particles.

The nature of the knitted wire mesh fabric is initially not specified further. It can be made of single-filament or multi-filament wire which has been knitted in any desired manner. The knitted fabrics can thus contain, for example, up to 5 round, flat, smooth and/or corrugated threads. Knitted materials can be, inter alia, steel, high-grade steel, such as 1.4571, copper, monel (2.4360) or aluminium. In addition to knitted wire fabrics from flat bed knitting machines, it is also possible to use, for example, two-layered knitted wire webs which are formed by collapsing knitted wire tubes, which have been produced with circular knitting machines, with respect to a folding plane running through the central axis of the knitted wire tubes.

According to the invention, the average clear mesh width of the knitted wire fabric is smaller than the average particle size $x_{50.3}$ of the particles which are intended to be accommodated in the holding device. This defines the internal distance (not the distance from wire middle to wire middle) of two adjacent mesh arms at the point of the greatest extension of a mesh. Preferably, the ratio between the mesh length, that is to say the distance between two adjacent mesh heads, and mesh width is between 4:1 and 0.5:1, particularly preferably between 2:1 and 1:1. The average clear mesh width then defines the average value of all the clear widths of individual meshes of a knitted wire mesh fabric. The average clear mesh width is established by methods known to the person skilled in the art (e.g. number, distance between and thickness of the needles on the knitting head, number and thickness of the wires etc.) during production of the knitted wire mesh fabric. The use of mesh fabric of non-uniform mesh width (i.e. differences in the mesh widths which exceed normal production-related tolerances) is not preferred, but is also possible in principle. In this case, the clear mesh width of the largest mesh is preferably smaller than the average particle size $x_{50.3}$.

In the simplest case, the holding device for particles can be formed by knitted wire mesh fabric alone clamped in the reactor. However, it is preferable for the knitted wire mesh fabric to be supported by a support, in order to withstand the mechanical stresses occurring. Both the support and the knitted wire mesh fabric are then part of the holding device for particles. The catalyst bed is formed from these together with catalyst particles.

The position of the knitted wire mesh fabric in the holding device for particles in the reactor through which fluid flows results from the function of the mesh fabric of retaining particles. It is therefore on the upstream side of the holding device.

In the reactor according to the invention, it is furthermore advantageous for it to be possible to use a simple slotted screen as the support. The use of a slotted screen which requires outlay to produce is not necessary, and a simple grating can also likewise be used. The mesh fabric is laid on the slotted screen or grating and fixed if necessary.

The mesh fabric laid on the grating now takes over the function of retaining the catalyst. As a result, not only can damage to the slotted screen be tolerated, but the openings in the slotted screen can be designed larger from the beginning.

This results in a further advantage: Due to the larger openings it is possible to increase the thickness of the slotted screen or grating without blockages being feared. As a result, the rigidity of the construction supporting the mesh fabric is in turn increased, so that higher amounts of catalyst can be supported and higher pressure losses and the resulting loads can be managed. The bulk with inert material can even be dispensed with, as a result of which higher amounts of catalyst can again be employed.

Embodiments of the invention are described in the following, it being possible for the embodiments to be combined freely with one another if the opposite does not clearly emerge from the context.

In one embodiment of the reactor according to the invention, the average clear mesh width of the knitted wire fabric is $\geq 20\%$ to $\leq 80\%$ of the average particle size $x_{50.3}$. Preferably, this value is $\geq 30\%$ to $\leq 60\%$ and more preferably $\geq 40\%$ to $\leq 50\%$. In this manner, in particular, an undesirable pressure loss during operation of the reactor due to particles trapped in the meshes is prevented.

In a further embodiment of the reactor according to the invention, the extensibility of the knitted wire mesh fabric under mechanical and/or thermal stress in the planar direction is $\geq 1\%$, preferably $\geq 2\%$. The extensibility in the planar direction should not exceed 50%, preferably 25%, preferably 10%. In this manner, it is ensured in particular that the mesh fabric adapts to the thermal expansions of the reactor without incurring damage and without particles falling through the meshes.

In a further embodiment of the reactor according to the invention, the wire diameter of the knitted wire mesh fabric is $\geq 0.03$ mm to $\leq 1$ mm. Preferably, the diameter of the wire from which the mesh fabric is knitted is $\geq 0.1$ mm to $\leq 0.5$ mm and more preferably $\geq 0.2$ mm to $\leq 0.3$ mm. In this manner, it is ensured in particular that the wire has an adequate stability at a simultaneously low weight and large area for passage of the fluid.

In a further embodiment of the reactor according to the invention, the height of the knitted wire mesh fabric in the holding device for particles is $\geq 3$ mm to $\leq 100$ mm. This can be achieved, for example, by laying the mesh fabric with several folds on a support. Preferably, the height is $\geq 5$ mm to $\leq 80$ mm and more preferably $\geq 10$ mm to $\leq 50$ mm. Passage of particles through the downstream side of the mesh fabric is particularly reliably prevented in this way, and free channels always remain for the fluid flowing through.

In a further embodiment of the reactor according to the invention, the knitted wire mesh fabric is a knitted wire mesh fabric deformed by mechanical action. For this, the mesh fabric can be rolled, or passed between two cylindrical rolls or toothed wheels. Mesh fabric deformed in this manner either has a low height, in order to maximize the space available for catalyst in the reactor (rolled) or acquires a more three-dimensional structure (by toothed wheels), so that a higher covering of mesh fabric can be achieved with a low outlay on material. This then has a particularly low pressure loss and a particularly low tendency towards blocking of the meshes.

In a further embodiment of the reactor according to the invention, the knitted wire mesh fabric is arranged on a support and the support comprises continuous openings in the direction of flow of the fluid. As already described, preferred supports are slotted screens and gratings. The support can be mounted in a floating manner on a support ring on the inside of the reactor wall in order to compensate the thermal expansion during operation.

Preferably, in this case knitted wire mesh fabric is additionally arranged between the support and the wall of the reactor. By this means, a gap existing for the purpose of compensation for thermal expansion is secured against passage of particles. Preferably, this knitted wire mesh fabric is a metallic gasket of mesh fabric. It is favourable for it to be made of the same material as the mesh fabric on the support.

In a particularly preferred embodiment of the reactor according to the invention, the knitted wire mesh fabric additionally present between the support and the wall of the reactor is arranged in a U-shaped form and an elastically pretensioned further knitted wire mesh fabric is incorporated in the depression thereby formed. For example, this can be a metallic gasket of mesh fabric.

The arms of the "U" can each in itself or together be vertical, in order for example to fit the shape of the reactor wall. However, it is also possible for the arms to at least partly take a horizontal course. They can then lie on a slotted screen or grating. Further mesh fabric can then be laid on this.

The nature of the pretensioning can be either a compression or an elongation. Preferably, the gasket is compressed before introduction, so that it then expands. The two sides of the "U" standing up are then pressed on to the support and/or a support ring and on to the reactor wall. This reliably and permanently avoids passage of inert or catalyst particles through any defects between the support, support ring and reactor wall or contact surface of the support ring. The metallic gasket in this context is elastically sprung and compensates on the one hand the accuracy of fit between the slotted screen and reactor wall and on the other hand the changes in the width of the gap between the slotted screen and reactor wall also during temperature changes.

In a further embodiment of the reactor according to the invention, catalyst particles are arranged on the knitted wire mesh fabric in the holding device. Suitable catalysts are described, inter alia, in EP 0 011 090 A1 and include:

(a) 1-100 g/l of support of at least one metal of groups 8 to 12 of the periodic table of the elements, and (b) 0-100 g/l of support of at least one transition metal of groups 4 to 6 and 12 of the periodic table of the elements, and (c) 0-100 g/l of support of at least one metal of the main group elements of groups 14 and 15 of the periodic table of the elements on an aluminium oxide support with a BET surface area of less than 20 m$^2$/g.

In a further embodiment of the reactor according to the invention, a layer of particles which are inert towards the fluid is arranged on the knitted wire mesh fabric in the holding device and catalyst particles are arranged on this layer. Particles which are inert towards the fluid are catalytically inactive and do not react with the fluid. If such particles lie as an intermediate layer on the mesh fabric, it is possible to employ smaller and therefore more active catalyst particles.

The present invention also provides a process for reaction of a fluid, wherein the reaction is carried out in a reactor according to the invention in the presence of heterogeneous catalyst particles and the catalyst particles are arranged in the holding device for catalyst particles. The case where an intermediate layer of inert particles is present in the catalyst bed is also included. The advantage of the process according to the invention lies in particular in longer service lives before renewed maintenance is necessary.

In one embodiment of the process according to the invention, when the reaction has ended the reactor continues to be heated at a temperature of from ≥200° C. to ≤400° C. in the presence of oxygen. It has been found that reactors according to the invention also advantageously withstand this burning off of carbon deposits.

In a further embodiment of the process according to the invention, the fluid comprises aromatic nitro compounds and hydrogen. In particular, it can be the hydrogenation of nitrobenzene to give aniline. The process according to the invention can be carried out for a longer time, before an increased nitrobenzene content (nitrobenzene breakthrough) occurs in the end product.

In a further embodiment of the process according to the invention, the reaction is carried out adiabatically. This process is described, for example, in EP 0 696 573 A1 and EP 0 696 574 A1. The process according to the invention advantageously withstands the jumps in temperature which occur in adiabatic reactions.

An additional aspect of the present invention is the use of knitted wire mesh fabric as a holding device for catalyst particles and/or inert particles in chemical reactions. For details and preferred embodiments, to avoid repetitions reference is made to the explanations of the reactor according to the invention.

Figure 2:
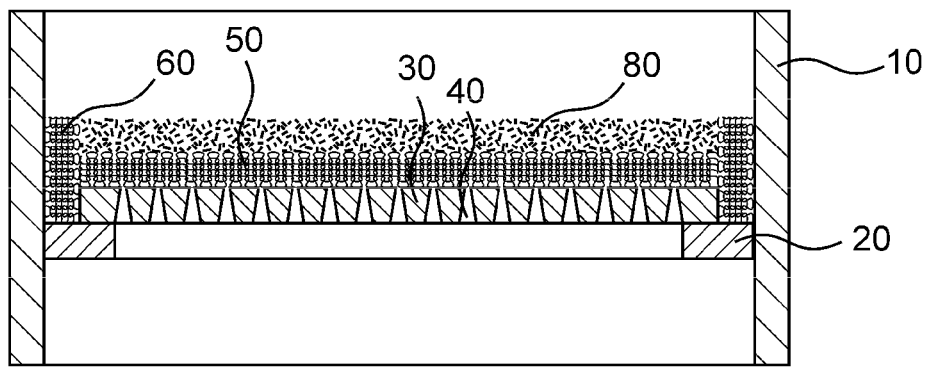
Figure 3:
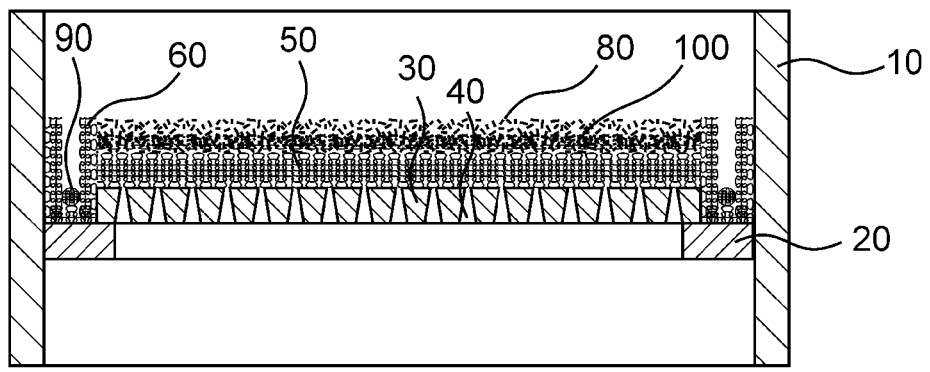
Figure 4:
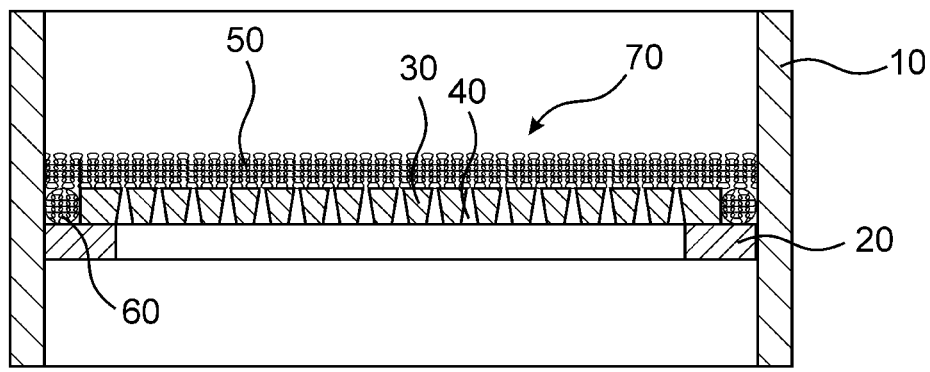
Figure 5:
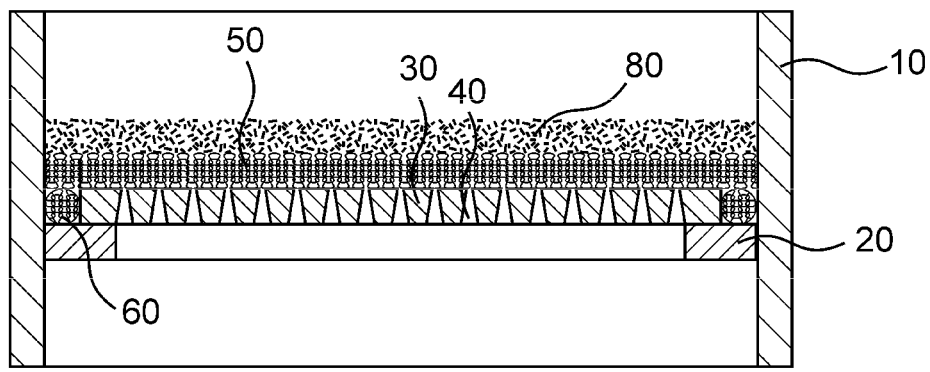
Figure 6:
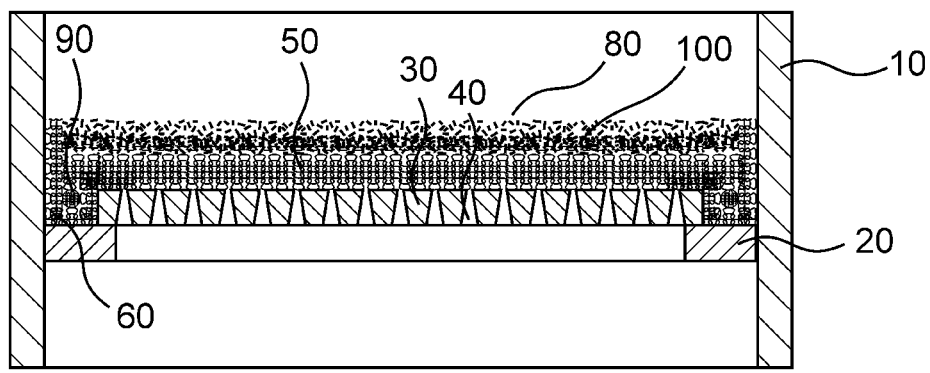
Figure 7:
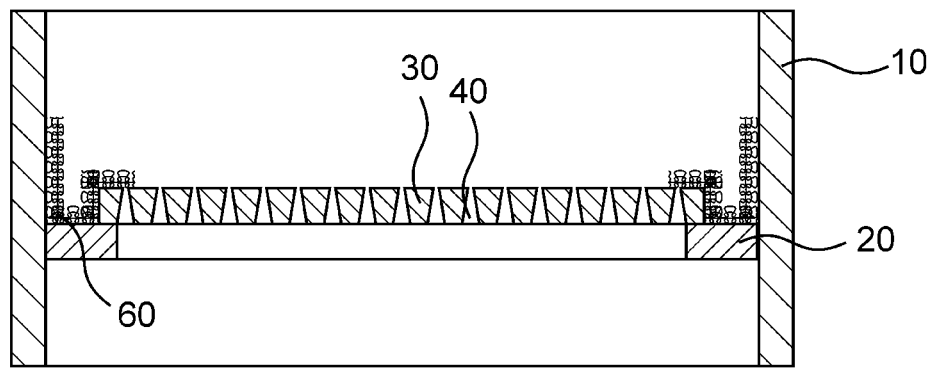

The invention is illustrated further with the aid of the following drawings and examples, but without being limited thereto. The figures show:

FIG. 1 a chemical reactor according to the invention
FIG. 2 a further chemical reactor according to the invention
FIG. 3 a further chemical reactor according to the invention
FIG. 4 a further chemical reactor according to the invention
FIG. 5 a further chemical reactor according to the invention
FIG. 6 a further chemical reactor according to the invention
FIG. 7 a detail of the reactor shown in FIG. 6

FIG. 1 shows a diagram of a cross-sectional view of a chemical reactor according to the invention such as can be employed, for example, as a fixed bed reactor with axial flow for the hydrogenation of nitrobenzene to give aniline. In the drawing, the direction of flow of a reaction fluid runs vertically from the top downwards.

A support ring 20 is constructed circumferentially on the inside of the reactor walls 10. A support 30 constructed as a slotted screen is mounted in a floating manner on this support ring 20. The slots 40 of this slotted screen widen when viewed in the direction of flow. The slotted screen can be demarcated by a circumferential supporting ring.

Knitted wire mesh fabric 50 is present on the support 30, and in the gap between the support 30 and the reactor wall 10 additional knitted wire mesh fabric 60 is incorporated.

The holding device formed by the support 30 and the knitted wire mesh fabric 50, 60 can accommodate catalyst particles in the region 70. The knitted wire mesh fabric 50 here is on the side of the holding device lying upstream when viewed in the direction of flow of a reaction fluid.

FIG. 2 shows the same cross-sectional view of a chemical reactor as FIG. 1, with the difference that catalyst particles 80 are now arranged on the knitted wire mesh fabric 50. The average clear mesh width of the knitted wire mesh fabric 50 here is such that the catalyst particles 80 are retained.

FIG. 3 shows further embodiments of the chemical reactor described above in FIGS. 1 and 2. Here, additional knitted wire mesh fabric 60 is laid in a U-shaped manner in the gap between the support 30 and the reactor wall 10. Further, elastically pretensioned knitted wire mesh fabric 90, for example a metallic gasket of mesh fabric, is laid in the depression thereby formed. The knitted wire mesh fabric 60 is fixed by the pretensioning.

A layer of inert particles 100 is furthermore present between the layer of catalyst particles 80 and the knitted wire mesh fabric 50.

FIG. 4 shows a device analogous to the reactor shown in FIG. 1, in which the knitted wire mesh fabric 50 lying on the support 30 is in each case constructed continuously up to the reactor wall 10. Additional knitted wire mesh fabric 60 of circular construction is arranged underneath this and likewise seals the gap between the support 30 and reactor wall 10. This configuration has the advantage that the layer of knitted wire mesh fabric 50 lying on top can be raised more easily for maintenance and inspection purposes.

The arrangement in FIG. 5 corresponds to that in FIG. 4, with the difference that analogously to FIG. 2, a layer of catalyst particles 80 has now been placed on the knitted wire mesh fabric 50.

FIG. 6 shows a reactor analogous to FIG. 3, the catalyst particles 80 being arranged on a layer of inert particles 100. The intermediate space between the support 30 and the reactor wall 10 is sealed by the additional mesh fabric 60. This mesh fabric 60 is laid in a U-shaped manner, the side of the "U" facing the reactor wall 10 being vertical and the other side of the "U" following the course of the shape of the support 30, that is to say initially being vertical and then running further horizontally on the support 30. The knitted wire mesh fabric 50 is then laid on this.

For a better overview, this course is shown in FIG. 7. This figure corresponds to FIG. 6, only the reactor walls 10, the support ring 20, support 30, slots 40 and the additional mesh fabric 60 being shown. An elastically pretensioned knitted wire mesh fabric 90 can again, as can be seen in FIG. 6, be laid in the depression formed by the "U" of the additional mesh fabric 60.

A reactor of high-grade steel which was charged with educts via a vaporizer served as an experimental plant for the example reactions (hydrogenation of nitrobenzene to give aniline under adiabatic reaction conditions). Nitrobenzene was pumped into the vaporizer from the top by means of metering pumps. The hydrogen was passed from the bottom into the vaporizer, which was heated to approx. 250° C., such that it was possible for the nitrobenzene pumped in from the top to vaporize in counter-current. The hydrogen supply was regulated by a mass flow regulator upstream of the vaporizer. The experimental plant was operated under 4 bar and the reaction gas was temperature-controlled at 240° C. in a heat exchanger before entry into the reactor.

A 400 mm high bulk of the catalyst was placed within the reaction tube. Details of the particular structure of the support construction, which was renewed before each experiment, are to be found in the corresponding example descriptions. After exit from the reactor, the reaction product was cooled with water. The non-volatile constituents were condensed out in this way and separated from the gaseous components in a downstream separator. The liquid constituents were led from the separator into a product collecting tank and collected there. Upstream of the collecting tank was a sampling point, at which it was possible to take samples of the product at regular intervals of time. These were analysed for the presence of nitrobenzene by gas chromatography. When the nitrobenzene content in the crude product exceeded 500 ppm, the reaction was ended and the catalyst was regenerated.

In all the example experiments, the load was set at 1 $g_{nitrobenzene}/(ml_{catalyst} \cdot h)$ and and the hydrogen:nitrobenzene ratio was set at approx. 80:1. The catalyst was an aluminium oxide-supported metal catalyst comprising 9 $g/l_{support}$ of Pd, 9 $g/l_{support}$ of V, 3 $g/l_{support}$ of Pb on α-aluminium oxide (see EP 0 011 090 A1). The average particle size $x_{50.3}$ of catalyst particles and if necessary inert particles was determined by means of sieve analysis. Sieves with nominal sieve opening widths of 1.25 mm, 1.4 mm, 1.6 mm, 1.7 mm and 1.8 mm ("small beads", catalyst particles, particle size between 1 mm and 2 mm) or of 2.5 mm, 3.0 mm, 3.5 mm, 4.0 mm and 4.5 mm ("large beads", inert material, particle sizes between 3.0 mm and 5.0 mm) were employed in this context. The particular $x_{50.3}$ values for the catalyst particles and inert particles were determined as 1.5 mm and 4 mm respectively.

For carrying out the reaction, the reactor was in each case rendered inert with nitrogen and charged with hydrogen at 240° C. over a period of 48 h. The nitrobenzene supply was then started and increased to the abovementioned value over 5 hours.

For carrying out the regeneration, the reactor was again rendered inert with nitrogen, heated to 270° C. and then charged with a stream of air in order to burn off coking deposits. This was carried out until no further release of heat was to be detected and the $CO_2$ content in the exhaust gas stream had fallen to less than 0.2% (determined by IR photometry).

Eight cycles comprising reaction and regeneration were first conducted in each example, so that the reactor and its contents were first heated up from the ambient temperature and were then exposed to several temperature variations of between 200 and 500° C. In the subsequent cycle (called the test cycle in the following), the point in time of the nitrobenzene breakthrough was recorded and after the regeneration the reactor was cooled to the ambient temperature and opened for inspection.

Comparison Example C-1

Euroslot Slotted Screen, Catalyst

In this example, an adiabatic hydrogenation of nitrobenzene to give aniline was carried out in a reactor which was equipped with a self-supporting slotted screen for the catalyst bed. The V-profile wire of the slotted screen had a width of 1.8 mm and a height of 3.7 mm and the slot width between the V-profile wires was 0.65 mm. The construction of the V-profile wire was normal, that is to say not inverted.

The slotted screen was constructed from segments arranged in parallel. Each segment lay on a support structure and was screwed to the next support. The connections projected beyond the screen surface. Corrosion and bending of the profiles and supporting profiles were prevented by using austenitic steel. The outer support ring of the screen was mounted in a floating manner on a bearing ring on the reactor wall. In the cold state, a gap of approx. 1 cm thereby existed between the support ring and the reactor wall. The catalyst fixed bed, the catalyst particles of which had an average particle size $x_{50.3}$ of 1.5 mm, lay on the slotted screen.

In the test cycle, nitrobenzene was already found with a concentration of more than 500 ppm in the reaction product after 4 days. On inspection of the reactor, deep thrombi were found in the catalyst bed. Underneath the thrombi, V-profile wires of the slotted screen had become detached. The catalyst bed likewise showed a depression along the reactor wall. The missing quantity of catalyst from the catalyst fixed bed was found underneath the slotted screen on the reactor base and in the downstream apparatuses of the plant.

Comparison Example C-2

Euroslot Slotted Screen, Inert Material, Catalyst

The experimental procedure corresponded to that from Example C-1, the supporting screen additionally being covered with two 5 cm high layers of inert material. The first layer lying on the screen was made of aluminium oxide beads of 6 mm diameter, and the layer lying on this was made of aluminium oxide beads of 4 mm diameter. Only on this second layer was the bulk catalyst, the catalyst particles of which had an average particle size $x_{50.3}$ of 1.5 mm, to be found.

In the test cycle, nitrobenzene was found with a concentration of more than 500 ppm in the reaction product after approx. 36 days. On inspection of the reactor, no thrombi were found in the catalyst bed, although damage was again observed on the supporting screen. The catalyst bed showed no depression along the reactor wall. Neither catalyst nor inert material was found on the reactor base and in the downstream apparatuses.

Example E-1 According to the Invention

Slotted Screen, Knitted Wire Fabric, Inert Material, Catalyst

The experimental procedure corresponded to that of Comparison Example C-1, the slotted screen additionally being covered with a knitted wire mesh fabric of continuous wire. The mesh fabric had a wire diameter of 0.23 mm, was double-knitted and folded in three layers. The mesh fabric was produced from high-grade steel and the average clear mesh width was 0.65 mm. The mesh fabric was fixed to the slotted screen by means of bolts.

The mesh fabric was covered with a 5 cm high layer of inert material of aluminium oxide beads, which had an average particle size $x_{50.3}$ of 4 mm.

The catalyst fixed bed, the catalyst particles of which had an average particle size $x_{50.3}$ of 1.5 mm, came to lie on the inert material.

In the test cycle, nitrobenzene was found with a concentration of more than 500 ppm in the reaction product after approx. 38 days. On inspection of the reactor, no thrombi were found in the catalyst bed, although damage was again observed on the supporting screen. The catalyst bed showed no depression along the reactor wall. Neither catalyst nor inert material was found on the reactor base and in the downstream apparatuses.

Example E-2 According to the Invention

Slotted Screen, Knitted Wire Fabric, Inert Material, Met. Gasket, Cat.

The experimental procedure corresponded to Example E-1, a metallic gasket of knitted wire mesh fabric, the wire diameter of which was 0.23 mm and the average clear mesh width of which was 0.65 mm, additionally being laid in the gap between the outer support ring of the slotted screen and the reactor wall. The gasket was still flexible even under the reaction conditions and had a diameter of 1.2 cm, so that it was fixed in the gap by its own spring tension.

In the test cycle, nitrobenzene was found with a concentration of more than 500 ppm in the reaction product after approx. 38 days. On inspection of the reactor, no thrombi were found in the catalyst bed, although damage was again observed on the supporting screen. The catalyst bed showed no depression along the reactor wall. Neither catalyst nor inert material was found on the reactor base and in the downstream apparatuses.

Example E-3 According to the Invention

Simple Grating, Knitted Wire Fabric, Metallic Gasket, Catalyst

In this example, an adiabatic hydrogenation of nitrobenzene to give aniline was carried out in a reactor which was equipped with a simple grating for the catalyst bed. The average mesh width of the grating was 30×10 mm. Corrosion and bending of the profiles and supporting profiles were prevented by using austenitic steel. The outer support ring of the grating was mounted in a floating manner on a bearing ring on the reactor wall. In the cold state, there was thereby a gap of approx. 1 cm between the support ring and the reactor wall. A metallic gasket of knitted wire mesh fabric, the wire diameter of which was 0.23 mm and the average clear mesh width of which was 0.65 mm, was laid in this gap. The gasket was still flexible even under the reaction conditions and had a diameter of 1.2 cm, so that it was fixed in the gap by its own spring tension.

The grating was covered with a knitted wire mesh fabric of continuous wire. The mesh fabric had a wire diameter of 0.23 mm, was double-knitted and folded in three layers. The mesh fabric was produced from high-grade steel and the average clear mesh width was 0.65 mm. The mesh fabric was fixed to the grating by means of bolts.

The mesh fabrics were covered with a 5 cm high layer of inert material of aluminium oxide beads, which had an average particle size $x_{50.3}$ of 4 mm.

The catalyst fixed bed, the catalyst particles of which had an average particle size $x_{50.3}$ of 1.5 mm, lay on the inert material.

In the test cycle, nitrobenzene was found with a concentration of more than 500 ppm in the reaction product after approx. 900 h. On inspection of the reactor, no thrombi were found in the catalyst bed, the average clear mesh width of the support grating was larger than the diameter of the catalyst particles and inert material particles. Along the reactor wall the catalyst bed showed no depression.

Neither catalyst nor inert material was found on the reactor base and in the downstream apparatuses.

Example E-4 According to the Invention

As Example 3, but with an Increased Bulk Catalyst

The experimental procedure corresponded to Example E-3, with the difference that the height of the bulk catalyst was increased to 50 cm. The same amount per unit time of nitrobenzene as in the comparison examples and Examples E-1 to E-3 was reacted. In this case, a volume load of the catalyst of only 0.8 $g_{nitrobenzene}/(ml_{catalyst} \cdot h)$ instead of 1 $g_{nitrobenzene}/ml_{catalyst} \cdot h)$ thereby resulted.

In the test cycle, nitrobenzene was found with a concentration of more than 500 ppm in the reaction product after approx. 46 days. On inspection of the reactor, no thrombi were found in the catalyst bed, the average clear mesh width of the support grating was larger than the diameter of the catalyst particles or inert material particles. Along the reactor wall the catalyst bed showed no depression. Neither catalyst nor inert material was found on the reactor base and in the downstream apparatuses.

For a better overview, the results are summarized in the following table:

| Example | C-1 | C-2 | E-1 | E-2 | E-3 | E-4 |
|---|---|---|---|---|---|---|
| Slotted screen (S) or grating (G) | S | S | S | S | G | G |
| Inert material | | X | X | X | | |
| Knitted fabric covering | | | X | X | X | X |
| Gasket on the reactor edge | | | | X | X | X |
| Nitrobenzene breakthrough after | 4 d | 36 d | 36 d | 38 d | 38 d | 46 d |
| Outlay for filling the reactor | low | high | moderate | moderate | low | low |
| Outlay for production of the support construction | high | high | high | high | low | low |
| Outlay for maintenance of the support construction | high | moderate | low | low | low | low |

The invention claimed is:

1. A chemical reactor for heterogeneously catalysed reaction of a fluid, comprising a holding device for particles through which the fluid flows, wherein a side of the holding device lying upstream when viewed in a direction of flow of the fluid comprises a first knitted wire mesh fabric, and an average clear mesh width of the first knitted wire fabric is smaller than an average particle size $x_{50.3}$ of the particles,
   wherein said first knitted wire mesh fabric is arranged on a support and the support comprises continuous openings in a direction of flow of the fluid, and
   wherein a second knitted wire mesh fabric is additionally arranged between the support and a wall of the reactor.

2. The reactor according to claim 1, wherein the average clear mesh width of said first knitted wire is from ≥20% to ≤80% of the average particle size $x_{50.3}$ of the particles.

3. The reactor according to claim 1, wherein extensibility of said first knitted wire mesh fabric under exposure to mechanical and/or thermal stress in a planar direction is ≥1%.

4. The reactor according to claim 1, wherein a wire diameter of said first knitted wire mesh fabric is from ≥0.03 mm to ≤1 mm.

5. The reactor according to claim 1, wherein a height of said first knitted wire mesh fabric in the holding device for particles is from ≥3 mm to ≤100 mm.

6. The reactor according to claim 1, wherein said first knitted wire mesh fabric is a knitted wire mesh fabric deformed by mechanical action.

7. The reactor according to claim 1, wherein said particles comprise catalyst particles that are arranged on the first knitted wire mesh fabric in the holding device.

8. The reactor according to claim 1, wherein a layer of particles which are inert towards the fluid is arranged on the first knitted wire mesh fabric in the holding device and catalyst particles are arranged on said layer of particles which are inert towards the fluid.

9. A process for reaction of a fluid, comprising carrying out a reaction in a reactor according to claim 1, in the presence of heterogeneous catalyst particles wherein the catalyst particles are arranged in the holding device, and wherein the fluid comprises aromatic nitro compounds and hydrogen.

10. The process according to claim 9, wherein when the reaction has ended, the reactor continues to be heated at a temperature of from ≥200° C. to ≤400° C. in the presence of oxygen.

11. The process according to claim 9, wherein the reaction is carried out adiabatically.

12. The reactor according to claim 1, further comprising a metallic gasket of mesh fabric.

13. The reactor according to claim 1, wherein the second knitted wire mesh fabric additionally arranged between a support and a wall of the reactor is arranged in a U-shaped form and an elastically pretensioned further knitted wire mesh fabric is incorporated in a depression thereby formed.

14. The reactor according to claim 1, wherein the first knitted fabric of said knitted wire is steel, high-grade steel, copper, monel, or aluminum.

15. The reactor according to claim 1, wherein the ratio between the mesh length and mesh width of said first knitted wire is between 4:1 and 0.5:1.

16. The reactor according to claim 1, wherein said support is a simple slotted screen or a simple grating.

17. A chemical reactor for heterogeneously catalysed reaction of a fluid, comprising a holding device for particles through which the fluid flows, wherein a side of the holding device lying upstream when viewed in a direction of flow of the fluid comprises knitted wire mesh fabric, and an average clear mesh width of the knitted wire fabric is smaller than an average particle size $x_{50.3}$ of the particles, wherein a layer of particles which are inert towards the fluid is arranged on the knitted wire mesh fabric in the holding device and catalyst particles are arranged on said layer of particles which are inert towards the fluid.

18. The reactor according to claim 17, wherein the average clear mesh width of said knitted wire is from ≥20% to ≤80% of the average particle size $x_{50.3}$ of the particles.

19. The reactor according to claim 17, wherein extensibility of said knitted wire mesh fabric under exposure to mechanical and/or thermal stress in a planar direction is ≥1%.

20. The reactor according to claim 17, wherein a wire diameter of said knitted wire mesh fabric is from ≥0.03 mm to ≤1 mm.

21. The reactor according to claim 17, wherein a height of said knitted wire mesh fabric in the holding device for particles is from ≥3 mm to ≤100 mm.

22. The reactor according to claim 17, wherein said knitted wire mesh fabric is a knitted wire mesh fabric deformed by mechanical action.

23. The reactor according to claim 17, wherein said knitted wire mesh fabric is arranged on a support and the support comprises continuous openings in a direction of flow of the fluid.

24. A process for reaction of a fluid, comprising carrying out a reaction in a reactor according to claim 17, in the presence of heterogeneous catalyst particles wherein the catalyst particles are arranged in the holding device, and wherein the fluid comprises aromatic nitro compounds and hydrogen.

25. The process according to claim 24, wherein when the reaction has ended, the reactor continues to be heated at a temperature of from ≥200° C. to ≤400° C. in the presence of oxygen.

26. The process according to claim 24, wherein the reaction is carried out adiabatically.

\* \* \* \* \*